(12) United States Patent
Choi

(10) Patent No.: US 7,761,709 B2
(45) Date of Patent: Jul. 20, 2010

(54) MEDIA RECEIVING APPARATUS, MEDIA SYSTEM HAVING THE SAME, AND CONTROL METHODS THEREOF

(75) Inventor: Young-hun Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 988 days.

(21) Appl. No.: 11/514,876

(22) Filed: Sep. 5, 2006

(65) Prior Publication Data

US 2007/0055876 A1 Mar. 8, 2007

(30) Foreign Application Priority Data

Sep. 6, 2005 (KR) .................... 10-2005-0082611

(51) Int. Cl.
*H04L 9/32* (2006.01)
*H04N 7/167* (2006.01)
(52) U.S. Cl. ........................... 713/168; 380/201
(58) Field of Classification Search ........... 713/168; 380/201, 210, 236; 726/31, 32
See application file for complete search history.

(56) References Cited

U.S. PATENT DOCUMENTS

| 6,915,426 B1* | 7/2005 | Carman et al. ............... 713/168 |
| 2004/0161108 A1* | 8/2004 | Ando et al. ................. 380/201 |
| 2004/0196972 A1 | 10/2004 | Zhu et al. |

* cited by examiner

*Primary Examiner*—Matthew B Smithers
*Assistant Examiner*—Ali S Abyaneh
(74) *Attorney, Agent, or Firm*—Roylance, Abrams, Berdo & Goodman, L.L.P.

(57) ABSTRACT

A power supplying apparatus and a power supplying method with superior stability against over-voltage and over-current are provided. The present invention relates to a media receiving apparatus which processes a copy-protected media signal received from an external media source. An interface is provided to connect with the external media source, an authentication processor which periodically generates connection authentication data and transmits the connection authentication data through the interface in reply to a request of the external media source. A controller which determines whether an authentication with the external media source is erroneous and an authentication error signal is provided to the external media source when an authentication error occurs so that the external media source recommences the authentication.

29 Claims, 7 Drawing Sheets

FIG. 3
(CONVENTIONAL ART)

MEDIA RECEIVING APPARATUS, MEDIA SYSTEM HAVING THE SAME, AND CONTROL METHODS THEREOF

CROSS-REFERENCE TO RELATED APPLICATIONS

This application claims the benefit under 35 U.S.C. §119(a) of Korean Patent Application No. 2005-0082611, filed on Sep. 5, 2005, in the Korean Intellectual Property Office, the entire disclosure of which is hereby incorporated herein by reference.

BACKGROUND OF INVENTION

1. Field of Invention

The present invention relates to a media receiving apparatus, a media system comprising the media receiving apparatus, and control methods thereof. More particularly, the present invention relates to a media receiving apparatus which receives and processes a media signal which is copy-protected, a media system comprising the media receiving apparatus, and control methods of the media receiving apparatus and the media system.

2. Description of the Related Art

A transmission interface for a media signal uses a Digital Visual Interface (DVI) and/or a High Definition Multimedia Interface (HDMI). The DVI and the HDMI are used as an interface for a digital signal using Transmission Minimized Differential Signaling (TMDS) link technology.

FIG. 1 is a block diagram of a media system which uses a conventional HDMI interface. As shown in FIG. 1, a media source 10 which transmits a media signal for the HDMI interface, includes a TMDS transmitter 11. A media receiving apparatus 20 which receives the media signal includes a TMDS receiver 21 and an Extended Display Identification Data (EDID) read-only memory (ROM) 23.

The TMDS transmitter 11 modulates a digital media signal which is a combination of a video signal and an audio signal to a high-speed serial data. The TMDS receiver 21 receives and demodulates the modulated signal.

Techniques for protecting high-definition digital contents are gaining popularity. Therefore, a High-bandwidth Digital Content Protection (HDCP) protocol has been suggested as a specification prevent the copying of digital content in DVI and HDMI environments.

The HDCP protocol relates to a technique for encoding and decoding digital content between the media source such as personal computers (PCs), digital versatile disk (DVD) players and set-top boxes, and the media receiving apparatus such as monitors, televisions, and projectors. The HDCP protocol specifies that the transmitting side performs a certain authentication process for the receiving side with respect to digital content requiring protection so that only authenticated devices can display or output the content.

The authentication process between the media source 10 and the media receiving apparatus 20 according to the HDCP is now explained with reference to FIGS. 1, 2 and 3. FIG. 2 is a flowchart explaining the HDCP operation and FIG. 3 is a screen showing the HDCP operation of the conventional media system, which is analyzed by analysis equipment.

First, the media source 10 verifies whether it is connected to the media receiving apparatus 20 through a Hot Plug Detect (HPD) pin (S10). "2. Hot Plug PASS" in FIG. 3 indicates the result of the connection verification.

When the TMDS transmitter 11 confirms the connection to the media receiving apparatus 20 through the HPD pin, the media source 10 reads out EDID information stored in the EDID ROM 23 of the media receiving apparatus 20 through a Display Data Channel (DDC) line (S11). The media source 10 sets a resolution and an output specification of the media signal according to the read EDID information.

The TMDS transmitter 11 performs an initial authentication with the TMDS receiver 21 (S12). The analysis result of the HDCP initial authentication is shown on the left in FIG. 3. The initial authentication is performed in a manner to allow a Secrete Device Key and a Key Selection Vector (KSV) assigned from the Digital Current Protection LLC to be mutually exchanged between the TMDS transmitter 11 and the TMDS receiver 21, thereby generating Link Integrity data (R1) required for the authentication by the transmitter 11 and the receiver 21. R1 is data required for the authentication. The TMDS transmitter 11 determines whether the authentication is successful by comparing its generated authentication data (R1) and the authentication data of the TMDS receiver 21 (S13).

If the initial authentication is successful, the connectivity of the HDMI interface is periodically verified (S14). An analysis result of the verification of the HDCP connectivity is shown on the right in FIG. 3.

Examination occurs in periods of 128 frames (2 seconds) to determine whether the HDCP is normally performed while the HDMI line is normally connected. The authentication data (R1) is updated based on control CTL data which is input through a TMDS channel, and the authentication data (R1) has an index A to verify the same corresponding values at the same time instance. The TMDS transmitter 11 reads out the authentication data from the TMDS receiver 21, compares it with its computed authentication data, and thus determines whether the authentication is successful (S15).

If the authentication is successful, the transmitting side outputs a normal media signal decodable at the receiving side, and the receiving side normally decodes the media signal (S16). Next, the receiving side can display the decoded signal. If the authentication is unsuccessful, the transmitting side scrambles the screen or sets the screen to mute at the receiving side by force (S17).

Meanwhile, HDCP authentication error may occur due to various factors even in a normal environment. For example, the connection state of a connector may become temporarily poor due to shock during the normal operation, or the communication may fail due to noise incurred at power supply. As indicated by B, and in contrast to A, in FIG. 3, when the authentication data (R1) do not match, it is impossible to view a normal screen with audio because of the authentication failure. In this case, the normal operation can be performed by restoring the HDMI line as indicated by C.

According to the HDCP specification, if the HDCP authentication fails, the TMDS transmitter 11 can set the video signal and/or audio signal to mute. At this time, the index does not increase. When the index does not increase, both the media source and the media receiving apparatus should not increase the index together. If the media source increases the index after mute setting while the media receiving apparatus does not increase its index, the index values will not match. Additionally, a temporal difference from the mute setting to the non-increase of the index is crucial. In conclusion, when the mute is set, the media source and the media receiving apparatus are highly likely to hold different index values. In this situation, even when the HDMI line is restored, the normal screen is not displayed because of the different index values.

Generally, there is no serious problem when the connectivity is verified based on the index value every 2 seconds (128 frames) at a minimum after the success of the initial authentication. However, once the index values do not match, it is meaningless to compare the authentication values through the connectivity verification. At this time, the media source 10 should match the index values by recommencing the authentication from the beginning.

Mostly, the media source 10 is responsible for the control in relation to the HDCP, and the media receiving apparatus 20 serves merely passive functions to reply by updating the relevant data upon the request from the media source 10. Therefore, it is impossible to view the normal video with audio unless the media source 10 resolves this problem. As a result, a user is inconvenienced when the user disconnects and re-connects the HDMI line, or turns off/on the system for the sake of normal viewing.

Accordingly, there is a need for an improved system and method for resolving errors by determining an authentication error which occurs in relation to the copy protection and for providing an authentication error signal.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a media receiving apparatus to resolve errors by determining an authentication error which occurs in relation to the copy protection and to provide an authentication error signal which facilitates the performance of re-authentication so that an initial authentication in relation to the copy protection can be automatically executed. A media system that comprises the media receiving apparatus and control methods thereof are also provided.

According to an exemplary embodiment of the present invention, a media receiving apparatus is provided. The media receiving apparatus processes a copy-protected media signal received from an external media source and comprises an interface, an authentication processor and a controller. The interface is provided to connect with the external media source. The authentication processor periodically generates connection authentication data and transmits the connection authentication data through the interface in reply to a request of the external media source. The controller determines whether an authentication with the external media source is erroneous and provides an authentication error signal to the external media source when an authentication error occurs so that the external media source recommences the authentication.

According to an aspect of an exemplary embodiment of the present invention, the interface comprises a connection detection pin according to the connection with the external media source, and the controller applies a level signal to the connection detection pin at a certain time period when the authentication error occurs.

According to another aspect of an exemplary embodiment of the present invention, the controller sets the connection detection pin to a low level at a period of time when the authentication error occurs.

According to yet another aspect of an exemplary embodiment of the present invention, the media receiving apparatus further comprises a mute flag of the media signal, and wherein the controller determines that the authentication error occurs if the mute flag is set over a period of time.

According to an aspect of an exemplary embodiment of the present invention, the controller determines that the authentication error occurs if the mute flag periodically repeats setting and clear.

According to another aspect of an exemplary embodiment of the present invention, the controller determines that the authentication error occurs if the connection authentication data which is periodically generated by the authentication processor, is the same for a period of time.

According to an aspect of an exemplary embodiment of the present invention, the media signal includes at least one of a high definition multimedia interface (HDMI) signal and a digital visual interface (DVI) signal which are copy-protected according to a high-bandwidth digital content protection (HDCP). The interface comprises a data communication pin to communicate data with the external media source, and the connection detection pin is a hot plug detect pin.

According to an aspect of an exemplary embodiment of the present invention, the authentication processor comprises a register and an HDCP engine. The register relates to the connection authentication data and the HDCP engine updates the register by periodically computing a connection authentication data value, and the external media source reads out a value of the register by performing an I2C communication through the data communication pin.

According to an aspect of an exemplary embodiment of the present invention, the media receiving apparatus further comprises a decoder which decodes the media signal, and wherein the authentication processor and the decoder are provided in a TMDS receiver.

According to an aspect of an exemplary embodiment of the present invention, the media receiving apparatus further comprises a graphic processor and a display unit. The graphic processor processes a graphic signal of the medial signal and the display unit displays the graphic signal. The TMDS receiver performs a display data channel (DDC) communication through the data communication pin.

According to an exemplary embodiment of the present invention, a method of controlling a media receiving apparatus is provided. An interface is provided to connect with an external media source and an authentication processor processes an authentication of a copy-protected media signal received from the external media source. Connection authentication data is periodically generated and the connection authentication data is transmitted through the interface in reply to a request of the external media source. A determination is made as to whether an authentication with the external media source is erroneous and an authentication error signal is provided to the external media source when an authentication error occurs so that the external media source recommences the authentication.

According to an aspect of an exemplary embodiment of the present invention, the interface comprises a connection detection pin according to the connection with the external media source, and the authentication error signal facilitates the application of a level signal to the connection detection pin for a period of time.

According to an aspect of an exemplary embodiment of the present invention, the connection detection pin is set to a low level for a certain time period since the authentication error signal is provided.

According to an aspect of an exemplary embodiment of the present invention, the media receiving apparatus further comprises a mute flag of the media signal, and a determination is made as to whether the authentication error occurs if the mute flag is set over a certain time period.

According to an aspect of an exemplary embodiment of the present invention, a determination is made that the authentication error occurs if the mute flag periodically repeats setting and clear.

According to an aspect of an exemplary embodiment of the present invention, it is determined that the authentication error occurs if the connection authentication data which is periodically generated by the authentication processor, is the same for a certain time period.

According to an aspect of an exemplary embodiment of the present invention, the media signal comprises at least one of a high definition multimedia interface (HDMI) signal and a digital visual interface (DVI) signal which are copy-protected according to a high-bandwidth digital content protection (HDCP). The interface also comprises a data communication pin to communicate data with the external media source, and the connection detection pin is a hot plug detect pin.

The foregoing and/or another aspects of exemplary embodiments of the present invention can be achieved by providing a media system including a media source which transmits a media signal. A media receiving apparatus comprises a first interface, an authentication processor and a controller. The first interface is provided to connect with the external media source. The authentication processor periodically generates connection authentication data and transmits the connection authentication data through the interface in reply to a request of the external media source. The controller determines whether an authentication with the external media source is erroneous and provides an authentication error signal to the external media source when an authentication error occurs so that the external media source recommences the authentication. The media source comprises a second interface and a source authentication processor. The second interface is provided to connect with the media receiving apparatus. The source authentication processor generates source authentication data and determines whether the generated source authentication matches the connection authentication data received from the media receiving apparatus by comparing both authentication data, and performs an initial authentication according to the authentication error signal received from the media receiving apparatus.

According to an aspect of an exemplary embodiment of the present invention, the first interface and the second interface each comprise a connection detection pin, the controller applies a level signal to the connection detection pin for a certain time period when an authentication error occurs, and the source authentication processor performs the initial authentication by receiving the level signal.

According to an aspect of an exemplary embodiment of the present invention, the controller sets the connection detection pin to a low level for a certain time period when the authentication error occurs, and the source authentication processor performs the initial authentication by receiving the low level signal.

According to an aspect of an exemplary embodiment of the present invention, the media receiving apparatus further comprises a mute flag of the media signal, the source authentication processor applies a mute flag setting control signal to the media receiving apparatus when the authentication fails, and the controller determines that the authentication error occurs if the mute flag is set over a period of time.

According to an aspect of an exemplary embodiment of the present invention, the controller determines that the authentication error occurs if the mute flag periodically repeats setting and clear.

According to yet another aspect of an exemplary embodiment of the present invention, the controller determines that the authentication error occurs if the connection authentication data which is periodically generated by the authentication processor, is the same for a period of time.

According to an aspect of an exemplary embodiment of the present invention, the media signal comprises at least one of a high definition multimedia interface (HDMI) signal and a digital visual interface (DVI) signal which are copy-protected according to a high-bandwidth digital content protection (HDCP), and the connection detection pin is a hot plug detect pin.

The foregoing and/or another aspects of exemplary embodiments of the present invention can be achieved by providing a method of controlling a media system which includes a media source transmitting a copy-protected media signal and a media receiving apparatus receiving and processing the media signal. Source authentication data and connection authentication data are periodically calculated by the media source and the media receiving apparatus, respectively. The media source requests the connection authentication data to the media receiving apparatus. The media receiving apparatus replies to the request of the media source. The media source reads out the connection authentication data according to the reply and determines whether the authentication is carried out by comparing the connection authentication data with the source authentication data. The media receiving apparatus determines whether the authentication is erroneous. The media receiving apparatus provides an authentication error signal to the media source when an authentication error occurs so that the media source recommences the authentication and the media source performs an initial authentication according to the authentication error signal.

According to an aspect of an exemplary embodiment of the present invention, the media source and the media receiving apparatus each comprise a connection detection pin. The connection detection pin is set to a low level for a certain time period once the authentication error signal is provided. The initial authentication is performed according to the applied low level signal.

According to an aspect of an exemplary embodiment of the present invention, the media receiving apparatus further comprises a mute flag of the media signal, it is determined that the authentication error occurs if the mute flag is set over a certain time period, the determining of the authentication by the media source comprises applying a mute flag setting control signal to the media receiving apparatus when the authentication fails, and the method further comprising setting, by the media receiving apparatus, the mute flag according to the mute flag setting control signal.

According to an aspect of an exemplary embodiment of the present invention, a determination is made that the authentication error occurs if the mute flag periodically repeats setting and clear.

According to another aspect of an exemplary embodiment of the present invention, a determination is made that the authentication error occurs if the connection authentication data which is periodically generated by the authentication processor, is the same for a period of time.

According to an aspect of an exemplary embodiment of the present invention, the media signal comprises at least one of a high definition multimedia interface (HDMI) signal and a digital visual interface (DVI) signal which are copy-protected according to a high-bandwidth digital content protection (HDCP), and the connection detection pin is a hot plug detect pin.

BRIEF DESCRIPTION OF THE DRAWINGS

The above and other exemplary objects, features and advantages of certain exemplary embodiments of the prevent invention will be more apparent from the following description taken in conjunction with the accompany drawings, in which:

Figure 3:
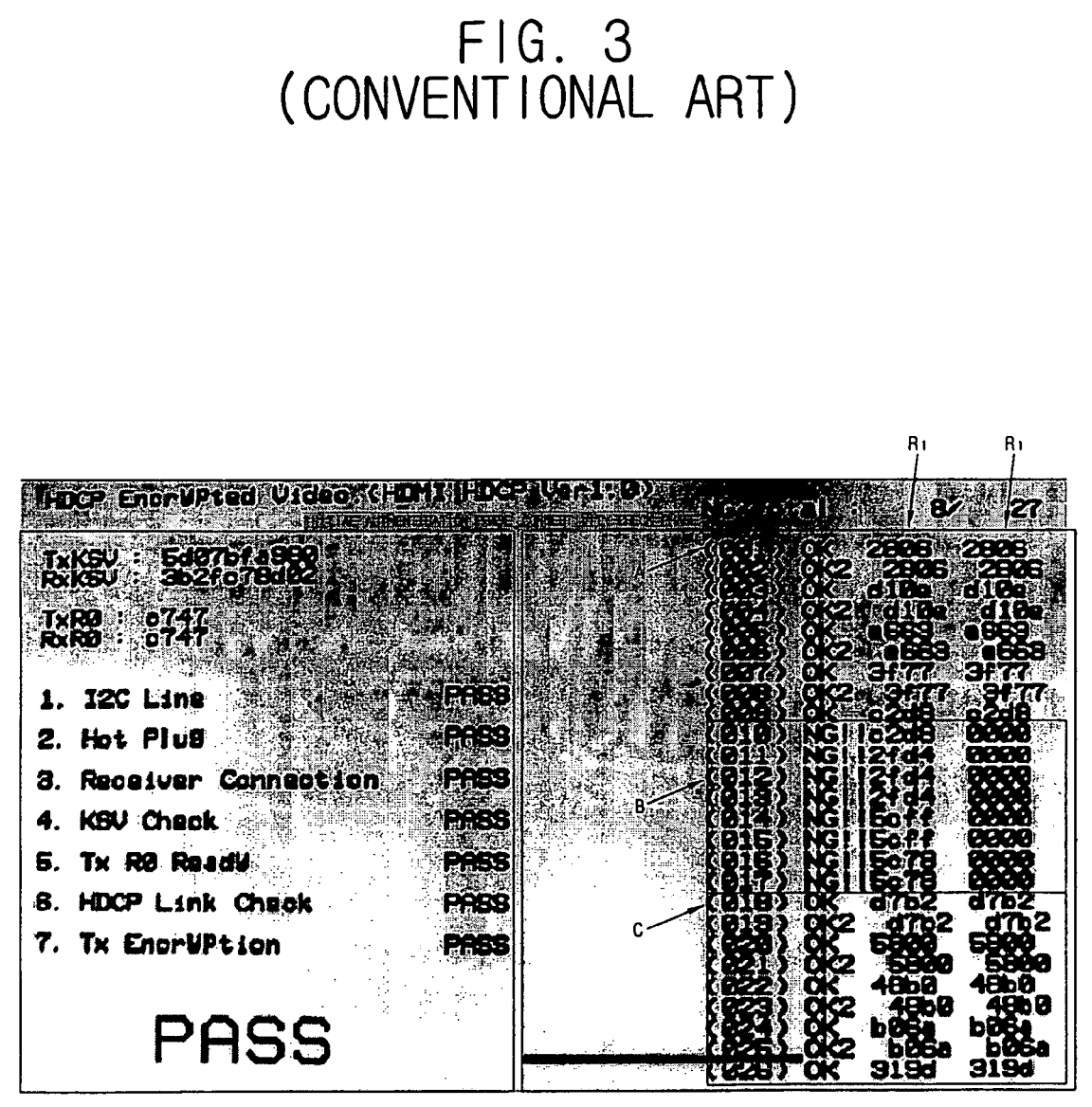

FIG. 3 is a diagram illustrating analysis data in relation to the conventional HDCP authentication system;

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
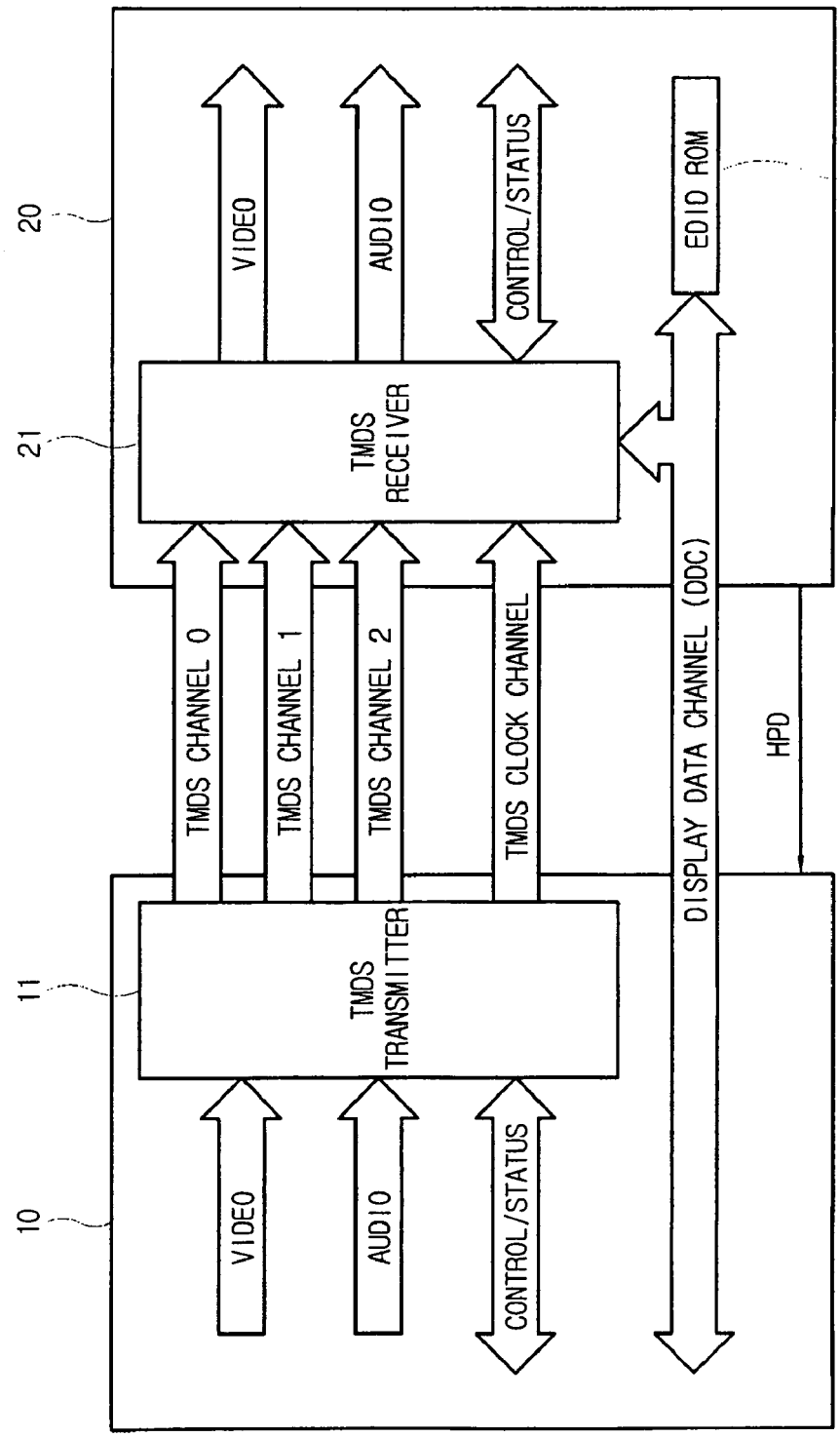
FIG. 1 is a block diagram of a conventional HDCP authentication system.
Figure 2:
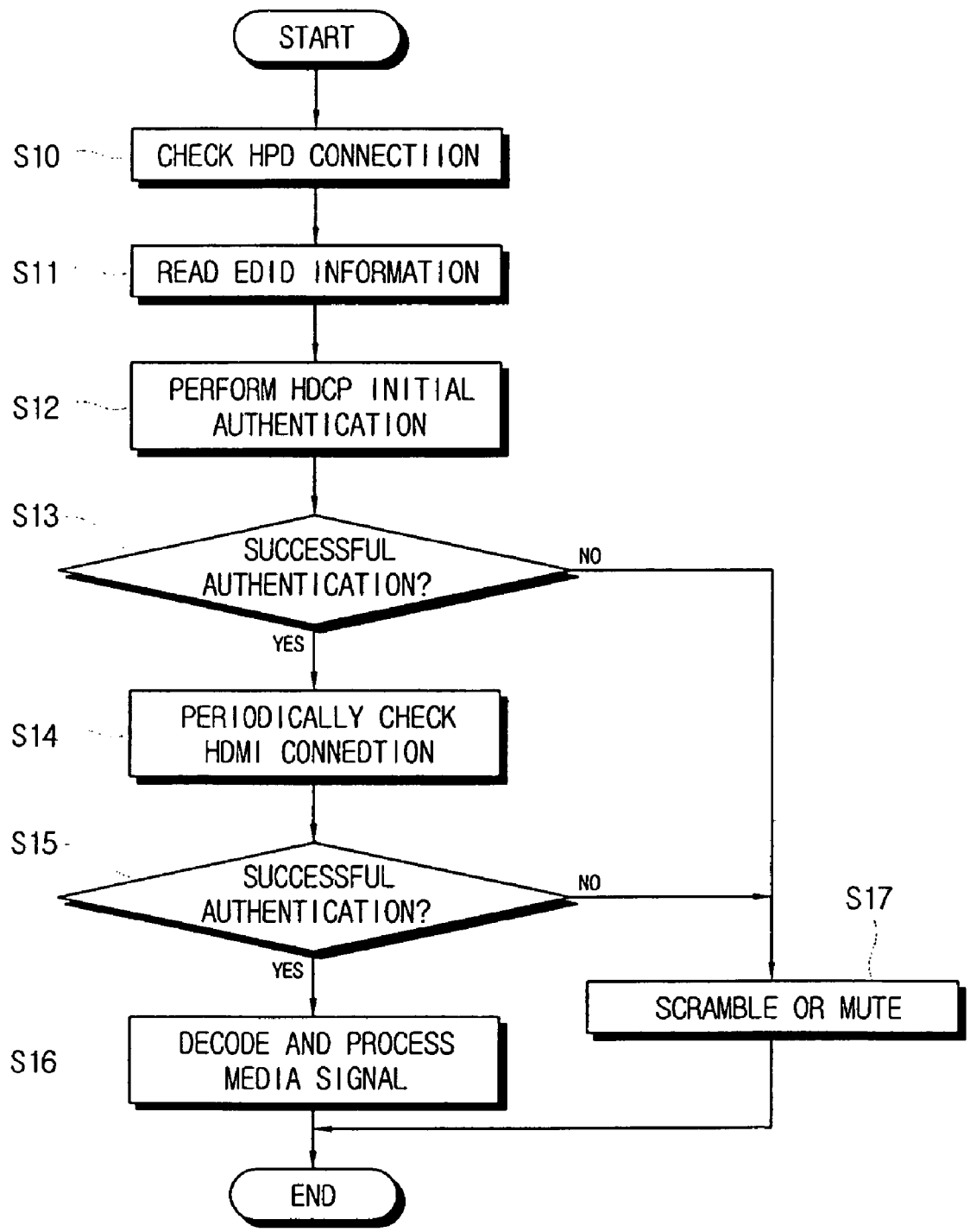
FIG. 2 is a flowchart explaining an authentication operation of the conventional HDCP authentication system.
Figure 4:
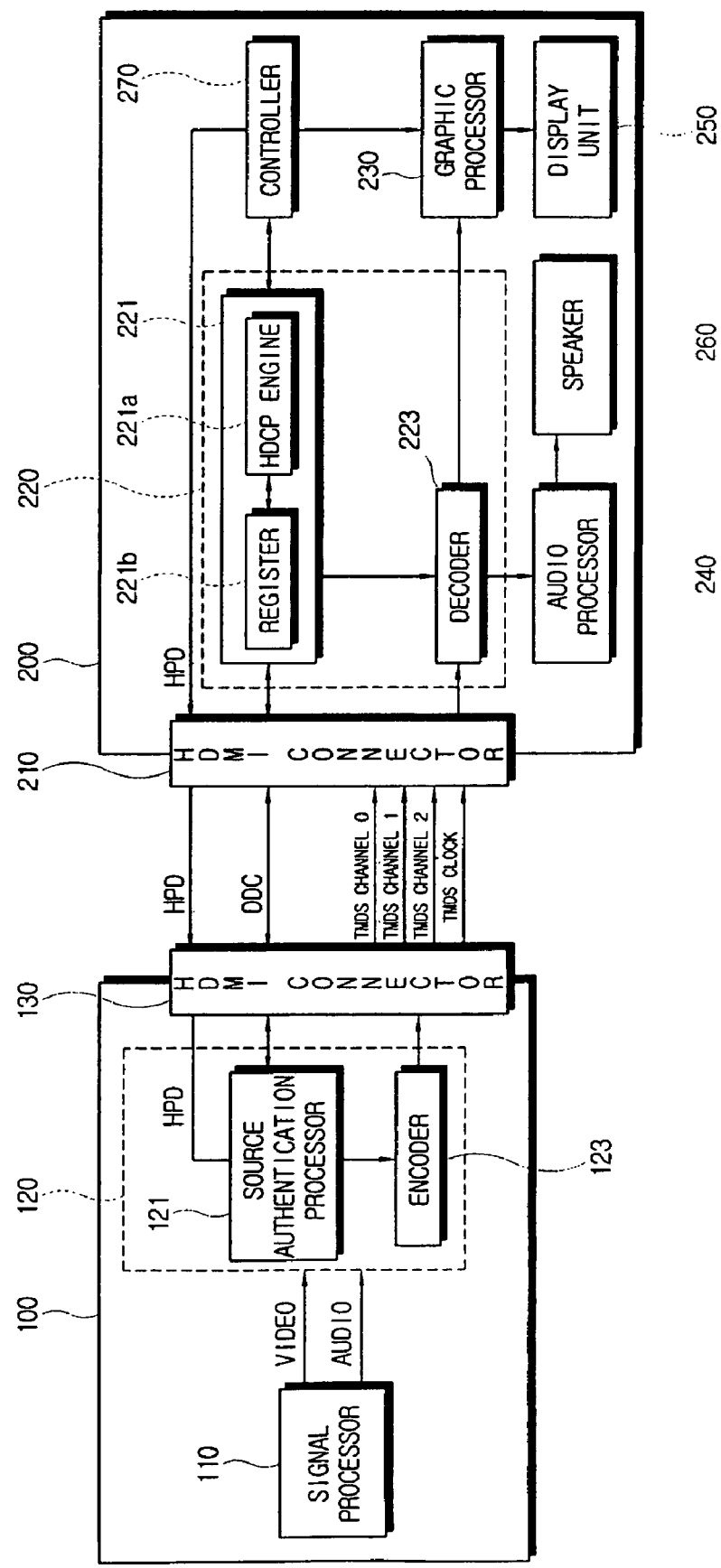
FIGS. 4 and 5 are block diagrams of a media receiving apparatus and a media system, respectively, according to an exemplary embodiment of the present invention.

FIG. 4 is a block diagram of a media receiving apparatus and a media system comprising the media receiving apparatus according to an exemplary embodiment of the present invention.

As illustrated in FIG. 4, the media system includes a media source 100 which processes a media signal to be copy-protected and transmits the processed signal, and a media receiving apparatus 200 which receives, decodes and outputs the media signal. The media source 100 may be implemented using devices such as PCs, DVD players and set-top boxes, and the media receiving apparatus 200 may be implemented using devices such as monitors, televisions and projectors.

The media source 100 includes a signal processor 110 which processes a video signal and/or an audio signal, a TMDS transmitter 120 which converts the video and audio signals to a TMDS digital media signal and performing an HDCP, and an HDMI connector 130.

The HDMI connector 130 has pins configured to receive four TMDS channel links. R, G and B signals and a clock signal are applied through channel links. A DDC communication line for bidirectional I2C (inter-integrated circuit) communications, and an HPD line for detecting the HDMI connection are connected through channel links, respectively. Note that a DVI connector can be used with the same configuration instead of the HDMI connector 130.

An HPD pin in which the HPD line is connected is used for the media source 100 to verify whether the media receiving apparatus 200 is connected. When the media receiving apparatus 200 is connected to the media source 100, a closed-loop is formed by a resistance value of the media receiving apparatus 200 and thus a high signal that is greater than a certain voltage is applied to the HPD pin. When the media receiving apparatus 200 is not connected to the media source 100, a low signal is applied to the HPD pin.

The TMDS transmitter 120 includes a source authentication processor 121 which processes the media signal received from the signal processor 110 to be copy-protected, and to authenticate the media signal, and an encoder 123 which enccodes the media signal. The source authentication processor 121 includes a memory (not shown) which stores a Secrete Device Key and a KSV assigned from the Digital Content Protection LLC, and an HDCP engine (not shown) which calculates a Secrete Value, a Session Key Number and Ro (Link Integrity) in relation to the authentication.

When confirming that the media receiving apparatus 200 is connected according to the HPD signal after the initialization, the source authentication processor 121 executes an initial authentication with the media receiving apparatus 200. Upon completing the initial authentication, success or failure of the authentication is determined by periodically verifying the HDMI connectivity. When the authentication fails, the source authentication processor 121 and the encoder 123 of the media source 100 scramble the media signal. According to the HDCP specification, the source authentication processor 121 can mute the video/audio signal by applying a mute flag setting control signal with respect to the media signal.

According to an exemplary embodiment of the present invention, the media receiving apparatus 200, as illustrated in FIG. 4, includes an HDMI connector 210, a TMDS receiver 220, a graphic processor 230, an audio processor 240, a display unit 250, a speaker 260 and a controller 270. The media receiving apparatus 200 communicates data and receives the media signal through the HDMI connector 210.

The received media signal is processed at the TMDS receiver 220. The TMDS receiver 220 includes an authentication processor 221 which processes authentication relating to the copy protection of the media signal, and a decoder 223 which restores and decodes the encoded media signal.

The authentication processor 221 includes a memory (not shown), an HDCP engine 221a and a register 221b. The memory stores a Secrete Device Key and a KSV assigned from the Digital Content Protection LLC. The HDCP engine 221a periodically calculates a Secrete Value, a Session Key Number and a Ro (Link Integrity) value in relation to the authentication. The register 221b periodically updates the Secrete Value, the Session Key Number and the Ro' (Link Integrity) value which are calculated by the HDCP engine 221a.

The Secrete Device Key and the KSV are used in the initial authentication. The Secrete Value, the Session Key Number and the Ro (Link Integrity) value in relation to the authentication are periodically updated and utilized to periodically verify the HDMI connectivity after the initial authentication. The media signal processed by the TMDS receiver 220 is output as the video signal and the audio signal, separately. The output video signal is processed by the graphic processor 230 and displayed on the display unit 250. The output audio signal is processed by the audio processor 240 and output through the speaker 260.

The display unit 250 is applicable to various display modules such as Digital Light Processing (DLP), Liquid Crystal Display (LCD), and Plasma Display Panel (PDP) among others. The graphic processor 230 includes a scaler which converts the video signal so that it conforms to vertical frequency, resolution and screen ratio of the output specification of the display unit 250.

The controller 270 determines whether the authentication is erroneous through communication with the authentication processor 221. Upon determining occurrence of the authentication error, the controller 270 provides an authentication error signal instructing the re-authentication to the media source 100 to recommence the initial authentication from the beginning.

Figure 5:
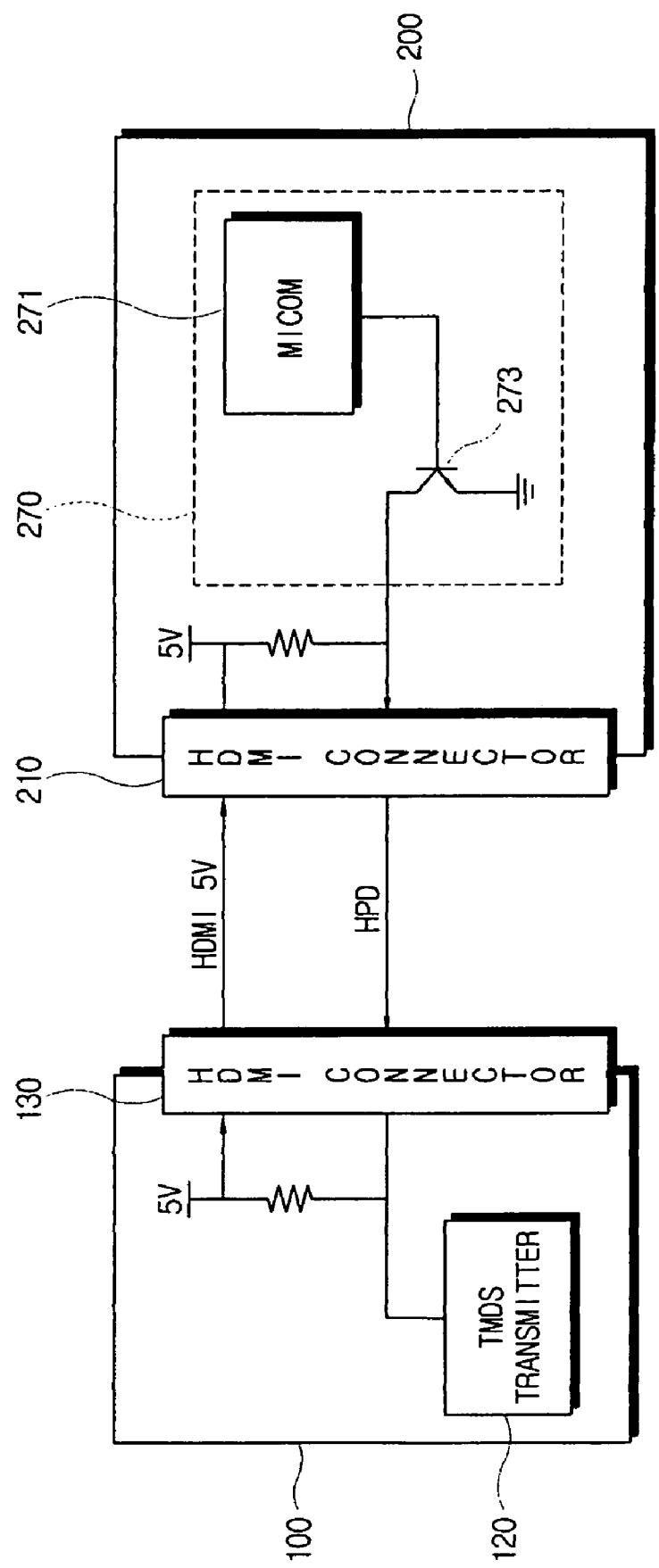

As illustrated in FIG. 5, the media source 100 supplies HDMI 5V voltage to detect the connection of the media receiving apparatus 200, and recommences the authentication from the beginning upon determining the new connection of the media receiving apparatus 200 according to a detection signal of the detection pin which relates to the connectivity of the media receiving apparatus 200 and is applied through the HPD line.

The controller 270 can be implemented using a microcomputer (MICOM) 271 and a switching element such as a transistor 273. The MICOM 271 applies a low signal to the transistor 273 in the normal authentication, and then the transistor is switched off. Accordingly, a closed loop is formed and a high signal is applied to the HPD pin. Thus, the media source 100 recognizes that the media receiving apparatus 200 is connected.

When the MICOM 271 determines that an error occurs during the authentication of the TMDS receiver 220, the MICOM 271 turns on the transistor 273 by applying a high signal to the transistor 273 for a certain time period. Accordingly, as the low signal is applied to the HPD line for a certain time period, the HPD pin is set to the low level and restored to the high level so that the media source 100 recommences the initial authentication. If an error occurs during the authentication while the media receiving apparatus 200 is normally connected, the HPD pin is set to the low level and restored for the certain time period so that the media source 100 can recommence the authentication. As a result, the error can be resolved.

FIG. 5 illustrates the controller 270 implemented using the MICOM and the switching element by way of example. It is noted that the controller 270 can be implemented using a controller provided in the TMDS receiver instead of the MICOM, and that the switching element can be realized in various ways.

The exemplary embodiment of the present invention explains that the authentication error signal is applied through the HPD line. The occurrence of the authentication error can be informed to the media source 100 through other means to recommence the authentication.

The controller 270 can detect the occurrence of the authentication error in various ways. In the exemplary embodiment of the present invention, the media receiving apparatus 200 may include a mute flag of the video/audio signal. For instance, when the mute flag of the video/audio signal is set over a certain time period, or the setting and clearing of the mute flag are repeated, the authentication error can be determined. As described earlier, when there is authentication failure, the media source 100 can set the mute flag. In this situation, the controller 270 can determine whether the authentication is erroneous based on the mute flag value.

Additionally, when the register value relating to the authentication data of the authentication processor 221 is the same over a certain time period, the authentication error can be determined. This is because the register value relating to the authentication data is not updated and thus this situation is determined as the authentication error.

Figure 6:
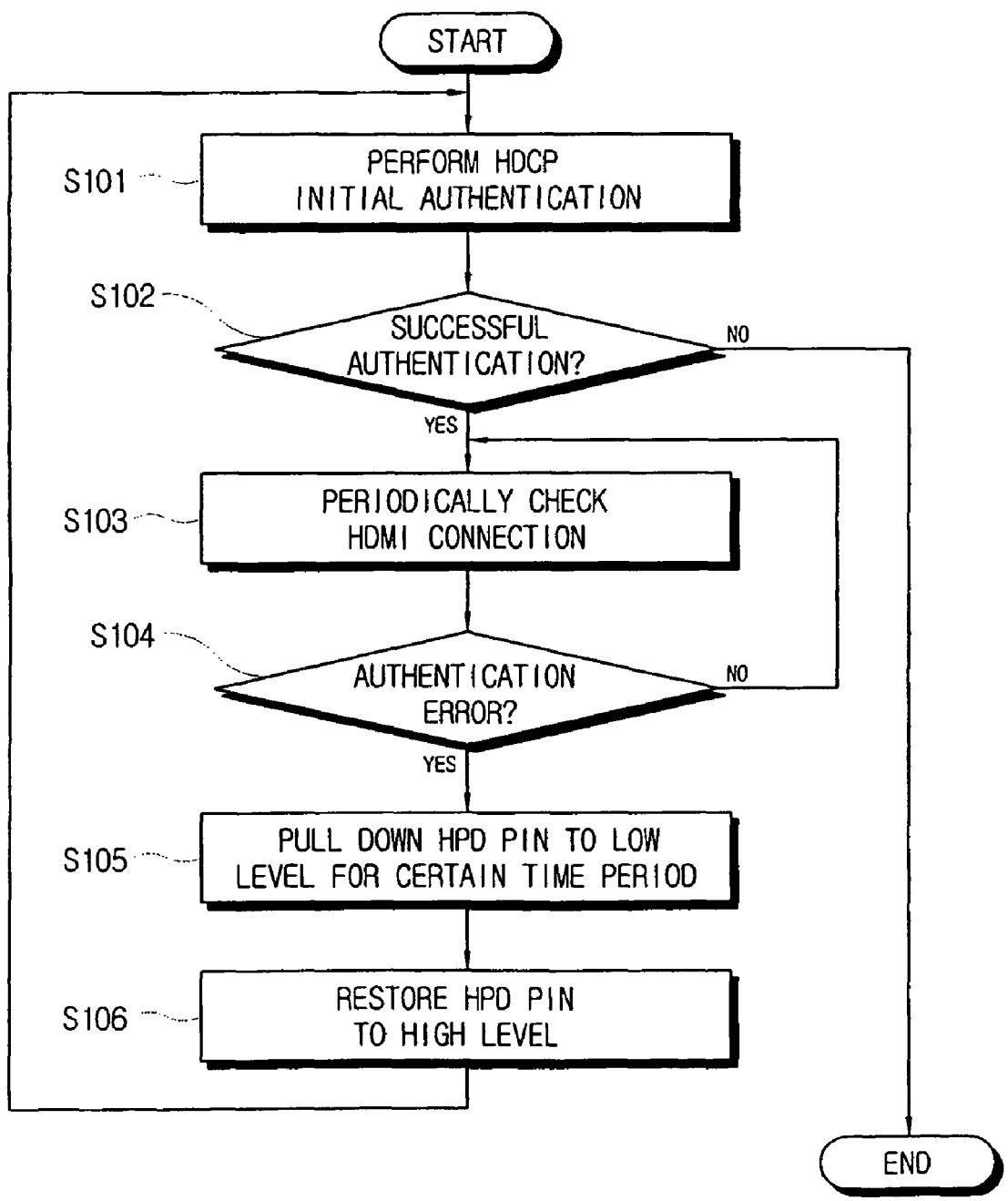
FIGS. 6 and 7 are flowcharts explaining operations of the media receiving apparatus and the media system, respectively, according to an exemplary embodiment of the present invention.

FIG. 6. is a flowchart explaining the HDCP authentication of the media system according to an exemplary embodiment of the present invention.

When power is supplied to the TMDS receiver 220, a verification is made as to whether the media receiving apparatus 200 is connected after the initialization. The connection or disconnection of the media receiving apparatus 200 can be determined according to the signal level of the HPD detection pin. When a high signal is applied to the HPD detection pin, the connection of the media receiving apparatus 200 is determined.

Upon determining the connection of the media receiving apparatus 200, the media source 100 reads out the EDID information stored in the EDID ROM (not shown) from the media receiving apparatus 200 through the DDC line. The media source 100 adjusts the resolution and the output specification of the media signal according to the read EDID information.

Next, the TMDS transmitter 120 performs the initial authentication with the TMDS receiver 220 (S101). In the initial authentication, the source authentication processor 121 transmits the Secrete Device Key and the A-KSV assigned from the Digital Current Protection LLC stored in the memory, to the media receiving apparatus 200 through the DDC line. The TMDS receiver 220 returns the Secrete Device Key and the B-KSV assigned from the Digital Current Protection LLC stored in its memory (not shown) to the TMDS transmitter 120 through the DDC line.

The TMDS transmitter 120 and the TMDS receiver 220 may each determine whether the Secrete Device Key of the other is valid based on the KSV value. The TMDS receiver 220 computes the authentication data at its HDCP engine 221a based on the Secrete Device Key received from the TMDS transmitter 120. Examples of the authentication data are Secrete Value, Session Key Number and Ro' (Link Integrity).

Likewise, the TMDS transmitter 120 computes Secrete Value, Session Key Number and Ro (Link Integrity), which are the authentication data, at its HDCP engine (not shown), and then verifies whether Ro matches Ro' by reading out Ro' of the TMDS receiver 220 (S102). If the two match, the HDCP initial authentication is successful. However, if the two do not match, the initial authentication fails. In other words, when the Secrete Device Key and the KSV of each apparatus are valid, Ro and Ro' match. Otherwise, Ro and Ro' do not match.

When the initial authentication is successful, the TMDS transmitter 120 verifies whether the HDCP authentication is normally performed by periodically verifying the connectivity of the HDMI interface (S103). The TMDS receiver 220 and the TMDS transmitter 120 compute and update the Secrete Value, the Session Key Number and R1 (Link Integrity) at least every two seconds. An index indicating a frame number which increases for each frame starting from 0 at the end of the initial authentication is represented by i. That is, the TMDS transmitter 120 and the TMDS receiver 220 have a similar index for verifying the corresponding values at the same time instance.

The update information during the validity verification of the HDMI connection, is updated based on the information of the previous frame after its initial setting. At this time, the frame information refers to the V-Sync on a basis of the TMDS clock. However, the TMDS link contains a CTL signal in a V-blank interval in addition to the video signal. Encryption-enabled information is contained in the CTL signal. Hence, the clock of the TMDS link and the CTL signal greatly affects the success or the failure of the HDCP authentication.

Meanwhile, the TMDS transmitter 120 compares periodically, for example, every two seconds, whether R1' updated at the register of the TMDS receiver 200 matches its computed R1 by comparing two values. According to a result of the comparison, the TMDS transmitter 120 determines whether the authentication is successful. As mentioned above, if the authentication is unsuccessful, the HDCP is locked and thus the screen is scrambled or muted.

At this time, the controller 270 determines whether the authentication is erroneous (S104). When the mute flag of the video/audio signal is set over a certain time period, the setting and the clearing of the mute flag are repeated, and/or the register value relating to the authentication data of the authentication processor 221 is similar over a certain time period, it can be determined that the authentication error occurs.

Upon determining the authentication error, the controller 270 sets the HPD line for a certain time period (S105) and restores the HPD line to a high level after the certain time period elapses (S106).

As a result, the TMDS transmitter 120 recognizes that the media receiving apparatus 200 is reconnected according to the high level signal of the HPD pin after being set to a low level and thus recommences the HDCP initial authentication. Since the initial authentication is recommenced even if the index is differentiated, the HDCP authentication can be normally executed between the media source 100 and the media receiving apparatus 200.

Figure 7:
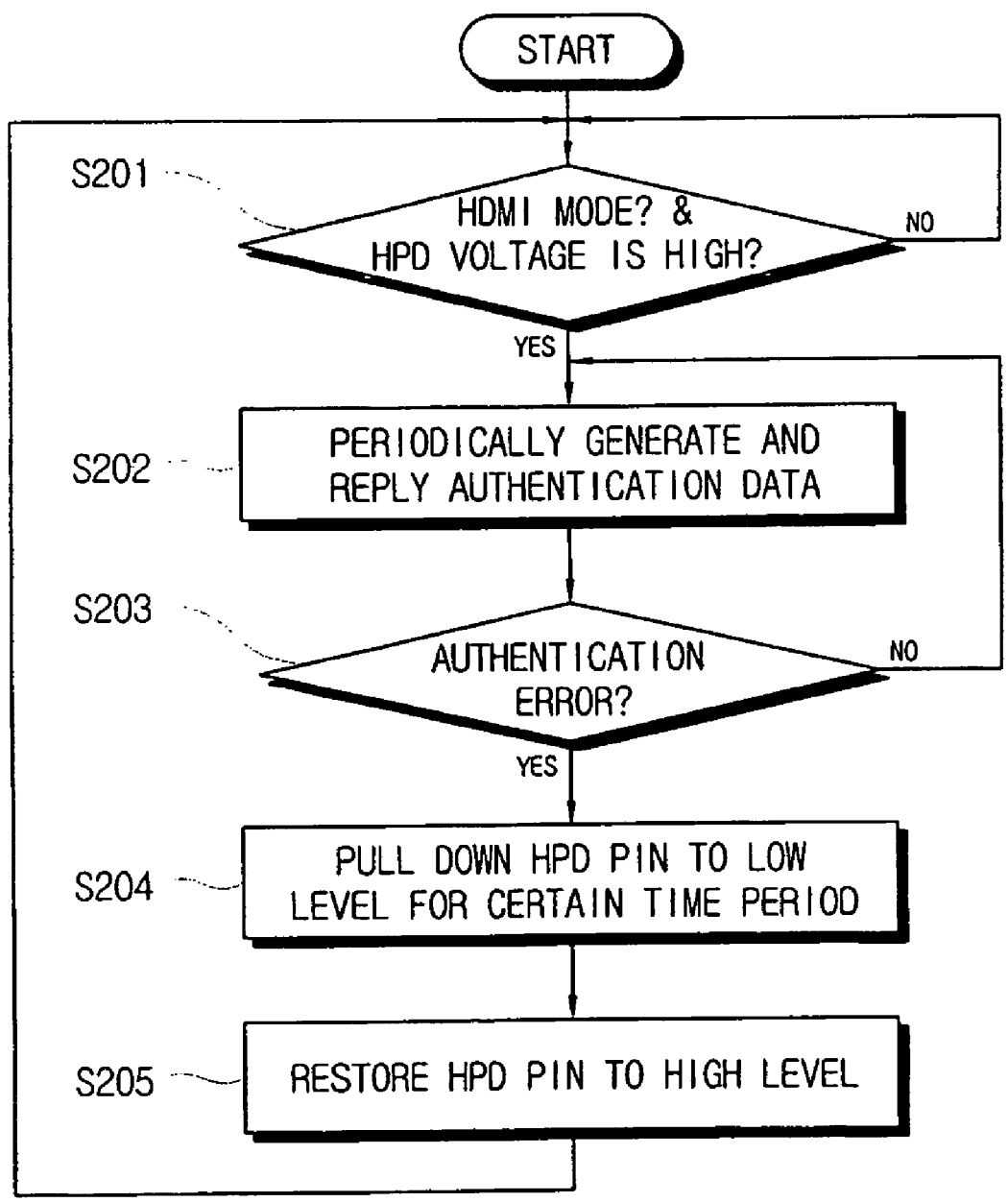

In the following, an operation of the media receiving apparatus 200 according to an exemplary embodiment of the present invention is explained in detail in reference to FIG. 7.

The authentication is commenced when the HDMI mode is currently set and the high signal is applied to the HPD pin (S201). These two conditions are initial conditions of the algorithm of the controller 270.

After successfully executing the initial authentication, the media receiving apparatus 200 periodically computes R1' and updates it to the register, and then replies to the request of the media source 100 (S202).

Hence, the authentication is executed as to whether the HDMI connection is valid. The controller 270 determines whether the authentication is erroneous (S203). Whether the authentication is erroneous is determined based on the mute flag of the video/audio signal and the authentication data, as discussed above.

When occurrence of the authentication error is determined, the controller 270 sets the HPD pin to apply the low signal for a certain time period (S204), and restores the HPD pin to the high level after the certain time period elapses (S205). Accordingly, the media source 100 recommences the initial authentication so that the normal authentication can be carried out between the media source 100 and the media receiving apparatus 200.

Although the exemplary embodiment of the present invention exemplifies the HDMI signal, all other signal formats including DVI, to which the copy protection protocol such as HDCP can be applied, may be used.

When the authentication error relating to the copy protection is determined, the media receiving apparatus provides the authentication error signal so that the media source can recommence the authentication. Therefore, the media receiving apparatus can resolve the error by automatically executing the initial authentication in relation to the copy prevention.

While the present invention has been shown and described with reference to certain exemplary embodiments thereof, it will be understood by those skilled in the art that various changes in form and details may be made therein without departing from the scope and spirit of the invention as defined by the appended claims and their equivalents.

What is claimed is:

1. A media receiving apparatus which processes a copy-protected media signal received from an external media source, comprising:
    an interface for connecting with an external media source, wherein the interface comprises a connection detection pin for connection with the external media source;
    an authentication processor for generating connection authentication data and for transmitting the connection authentication data through the interface in reply to a request of the external media source; and
    a controller for determining whether an authentication with the external media source is erroneous and for providing an authentication error signal to the external media source when an authentication error occurs whereby the external media source recommences the authentication;
    wherein the media signal comprises at least one of a high definition multimedia interface (HDMI) signal and a digital visual interface (DVI) signal which are copy-protected according to a high-bandwidth digital content protection (HDCP), the interface comprises a data communication pin to communicate data with the external media source, and the connection detection pin comprises a hot plug detect pin.

2. The media receiving apparatus according to claim 1, wherein the controller applies a level signal to the connection detection pin for a period of time when the authentication error occurs.

3. The media receiving apparatus according to claim 2, wherein the controller sets the connection detection pin to a low level for a period of time when the authentication error occurs.

4. The media receiving apparatus according to claim 3, further comprising a mute flag of the media signal, and wherein the controller determines that the authentication error occurs if the mute flag is set over a period of time.

5. The media receiving apparatus according to claim 4, wherein the controller determines that the authentication error occurs if the mute flag periodically repeats setting and clearing.

6. The media receiving apparatus according to claim 5, wherein the controller determines that the authentication error occurs if the connection authentication data which is periodically generated by the authentication processor, is constant for a period of time.

7. The media receiving apparatus according to claim 1, wherein the authentication processor comprises:
    a register for relating to the connection authentication data; and
    an HDCP engine for updating the register by periodically computing a connection authentication data value; and
    wherein the external media source reads out a value of the register by performing an I2C (inter-integrated circuit) communication through the data communication pin.

8. The media receiving apparatus according to claim 7, further comprising a decoder for decoding the media signal, wherein
    a Transmission Minimized Differential Signaling (TMDS) receiver comprises the authentication processor and the decoder.

9. The media receiving apparatus according to claim 8, further comprising:
    a graphic processor which processes a graphic signal of the medial signal; and
    a display unit which displays the graphic signal;

wherein the TMDS receiver performs a display data channel (DDC) communication through the data communication pin.

10. A method of controlling a media receiving apparatus which comprises an interface for connecting with an external media source, wherein the interface comprises a connection detection pin for the connection with the external media source, and an authentication processor which processes an authentication of a copy-protected media signal received from the external media source, the method comprising:
periodically generating connection authentication data and transmitting the connection authentication data through the interface in reply to a request of an external media source;
determining whether an authentication with the external media source is erroneous; and
providing an authentication error signal to the external media source when an authentication error occurs whereby the external media source recommences the authentication;
wherein the media signal comprises at least one of a high definition multimedia interface (HDMI) signal and a digital visual interface (DVI) signal which are copy-protected according to a high-bandwidth digital content protection (HDCP), the interface comprises a data communication pin to communicate data with the external media source, and the connection detection pin comprises a hot plug detect pin.

11. The method according to claim 10, wherein the providing of the authentication error signal comprises applying a level signal to the connection detection pin for a period of time.

12. The method according to claim 11, wherein the providing of the authentication error signal comprises setting the connection detection pin to a low level for a period of time.

13. The method according to claim 12, wherein the media receiving apparatus further comprises a mute flag of the media signal, and wherein a determination is made that the authentication error occurs if the mute flag is set over a period of time.

14. The method according to claim 13, wherein a determination is made that the authentication error occurs if the mute flag periodically repeats setting and clearing.

15. The method according to claim 14, wherein a determination is made that the authentication error occurs if the connection authentication data periodically generated by the authentication processor remains constant for a period of time.

16. A media system comprising:
a media receiving apparatus comprising:
a first interface for connecting with the external media source;
an authentication processor for generating connection authentication data and for transmitting the connection authentication data through the interface in reply to a request of the external media source; and
a controller for determining whether an authentication with the external media source is erroneous and for providing an authentication error signal to the external media source when an authentication error occurs whereby the external media source recommences the authentication; and
a media source comprising:
a second interface for connecting with the media receiving apparatus; and
a source authentication processor for generating source authentication data, for determining whether the generated source authentication matches the connection authentication data received from the media receiving apparatus by comparing the connection authentication data with the source authentication data, and for performing an initial authentication according to the authentication error signal received from the media receiving apparatus;
wherein at least one of the first interface and the second interface comprise a connection detection pin, and wherein the media signal comprises at least one of a high definition multimedia interface (HDMI) signal and a digital visual interface (DVI) signal which are copy-protected according to a high-bandwidth digital content protection (HDCP), and the connection detection pin comprises a hot plug detect pin.

17. The media system according to claim 16, wherein the controller applies a level signal to the connection detection pin for a period of time when an authentication error occurs, and the source authentication processor performs the initial authentication by receiving the level signal.

18. The media system according to claim 17, wherein the controller sets the connection detection pin to a low level for a period of time when the authentication error occurs, and the source authentication processor performs the initial authentication by receiving the low level signal.

19. The media system according to claim 18, wherein the media receiving apparatus further comprises a mute flag of the media signal, the source authentication processor applies a mute flag setting control signal to the media receiving apparatus when the authentication fails, and the controller determines that the authentication error occurs if the mute flag is set over a period of time.

20. The media system according to claim 19, wherein the controller determines that the authentication error occurs if the mute flag periodically repeats setting and clearing.

21. The media system according to claim 20, wherein the controller determines that the authentication error occurs if the connection authentication data remains constant for a period of time.

22. A method of controlling a media system which comprises a media source transmitting a copy-protected media signal and a media receiving apparatus receiving and processing the media signal, the method comprising:
periodically calculating, by a media source and a media receiving apparatus, source authentication data and connection authentication data, respectively;
requesting, by the media source, the connection authentication data to the media receiving apparatus;
replying, by the media receiving apparatus, to the request of the media source;
reading out, by the media source, the connection authentication data according to the reply and determining whether the authentication is carried out by comparing the connection authentication data with the source authentication data;
determining, by the media receiving apparatus, whether the authentication is erroneous;
providing, by the media receiving apparatus, an authentication error signal to the media source when an authentication error occurs whereby the media source recommences the authentication; and
performing, by the media source, an initial authentication according to the authentication error signal;
wherein at least one of the media source and the media receiving apparatus comprise a connection detection pin, and wherein the media signal comprises at least one of a high definition multimedia interface (HDMI) signal and a digital visual interface (DVI) signal which are copy-protected according to a high-bandwidth digital content protection (HDCP), and the connection detection pin comprises a hot plug detect pin.

23. The method according to claim 22, wherein the providing of the authentication error signal comprises setting the connection detection pin to a low level for a period of time, and the initial authentication is performed according to the applied low level signal.

24. The method according to claim 23, wherein the media receiving apparatus further comprises a mute flag of the media signal, wherein a determination is made that the authentication error occurs if the mute flag is set over a period of time, the determining of the authentication by the media source comprises applying a mute flag setting control signal to the media receiving apparatus when the authentication fails, and the method further comprising setting, by the media receiving apparatus, the mute flag according to the mute flag setting control signal.

25. The method according to claim 24, wherein a determination is made that the authentication error occurs if the mute flag periodically repeats setting and clearing.

26. The method according to claim 25, wherein a determination is made that the authentication error occurs if the connection authentication data remains constant for a period of time.

27. A media system for processing a copy-protected media signal, the system comprising:

an interface for connecting with a media source, wherein the interface comprises a connection detection pin for connection with the external media source; an authentication processor for generating connection authentication data and for transmitting the connection authentication data through the interface in reply to a request of the media source;

a controller for determining whether an authentication with the media source is erroneous and for providing an authentication error signal to the media source when an authentication error occurs whereby the media source recommences the authentication; and a register for periodically updating a Secrete Value, a Session Key Number and Ro (Link Integrity) value;

wherein the media signal comprises at least one of a high definition multimedia interface (HDMI) signal and a digital visual interface (DVI) signal which are copy-protected according to a high-bandwidth digital content protection (HDCP), the interface comprises a data communication pin to communicate data with the external media source, and the connection detection pin comprises a hot plug detect pin.

28. The media system according to claim 27, wherein a source authentication processor stores a Secrete Device Key and a Key Selection Vector (KSV) assigned from the Digital Content Protection LLC.

29. The media system according to claim 27, wherein a source authentication processor calculates the Secrete Value, the Session Key Number and the Ro (Link Integrity) value in relation to authentication.

* * * * *